(12) United States Patent
Kruse

(10) Patent No.: US 8,352,744 B2
(45) Date of Patent: Jan. 8, 2013

(54) PRODUCT AUTHENTICATION METHOD

(75) Inventor: Albrecht Kruse, Stuttgart (DE)

(73) Assignee: Sata GmbH & Co. KG, Kornwestheim (DE)

( * ) Notice: Subject to any disclaimer, the term of this patent is extended or adjusted under 35 U.S.C. 154(b) by 1470 days.

(21) Appl. No.: 10/571,955

(22) PCT Filed: May 19, 2004

(86) PCT No.: PCT/EP2004/005381
§ 371 (c)(1),
(2), (4) Date: Sep. 18, 2006

(87) PCT Pub. No.: WO2005/036504
PCT Pub. Date: Apr. 21, 2005

(65) Prior Publication Data
US 2007/0055883 A1 Mar. 8, 2007

(30) Foreign Application Priority Data
Sep. 16, 2003 (DE) .................................. 103 43 064

(51) Int. Cl.
*H04L 9/32* (2006.01)
(52) U.S. Cl. .............................. 713/179; 705/28; 380/51
(58) Field of Classification Search ........................ None
See application file for complete search history.

(56) References Cited

U.S. PATENT DOCUMENTS

| | | | |
|---|---|---|---|
| 5,367,148 A | 11/1994 | Storch | |
| 6,308,991 B1 * | 10/2001 | Royer | 283/102 |
| 6,442,276 B1 * | 8/2002 | Doljack | 380/51 |

FOREIGN PATENT DOCUMENTS

| | | |
|---|---|---|
| DE | 19832990 | 1/2000 |
| DE | 199 41 362 A1 | 1/2001 |
| DE | 199 45 760 A1 | 3/2001 |

(Continued)

OTHER PUBLICATIONS

International Search Report PCT/EP2004/005381.

(Continued)

*Primary Examiner* — Kaveh Abrishamkar
(74) *Attorney, Agent, or Firm* — Martin Fleit

(57) ABSTRACT

The invention relates to a method that allows a third party to authenticate a manufacturer's individual product. According to said method, at least one first code that is specific for said individual product is generated and is applied to the product or the packaging thereof by the manufacturer, said first code is stored in a publicly accessible database, the first code is read by the third party and is entered into the database, and the database generates an output based on a comparison between the entered first code and the first codes of all products stored in the database, said output indicating whether the first code is identical to a stored first code and/or whether the first code has been retrieved at an earlier time. Previously known methods of this type offer no sufficiently sure possibility to verify whether the product is an original product or a counterfeit product. The aim of the invention is to further develop said method so as to make it possible to distinguish with adequate reliability between originals and counterfeit products. Said aim is achieved by the fact that the first code is provided with a removable cover once the first code has been applied, said cover concealing the code and being removed by the third party before he/she reads and enters the first code.

16 Claims, 1 Drawing Sheet

FOREIGN PATENT DOCUMENTS

| | | |
|---|---|---|
| DE | 19945760 | 3/2001 |
| EP | 1 081 639 A2 | 3/2001 |
| EP | 1081639 | 3/2001 |
| WO | WO 01/99062 A1 | 12/2001 |
| WO | 03007252 | 1/2003 |
| WO | WO 03/007252 | 1/2003 |

OTHER PUBLICATIONS

International Preliminary Report on Patentability PCT/EP2004/005381.

Written Opinion for PCT/EP2004/005381 published Mar. 16, 2006.

* cited by examiner

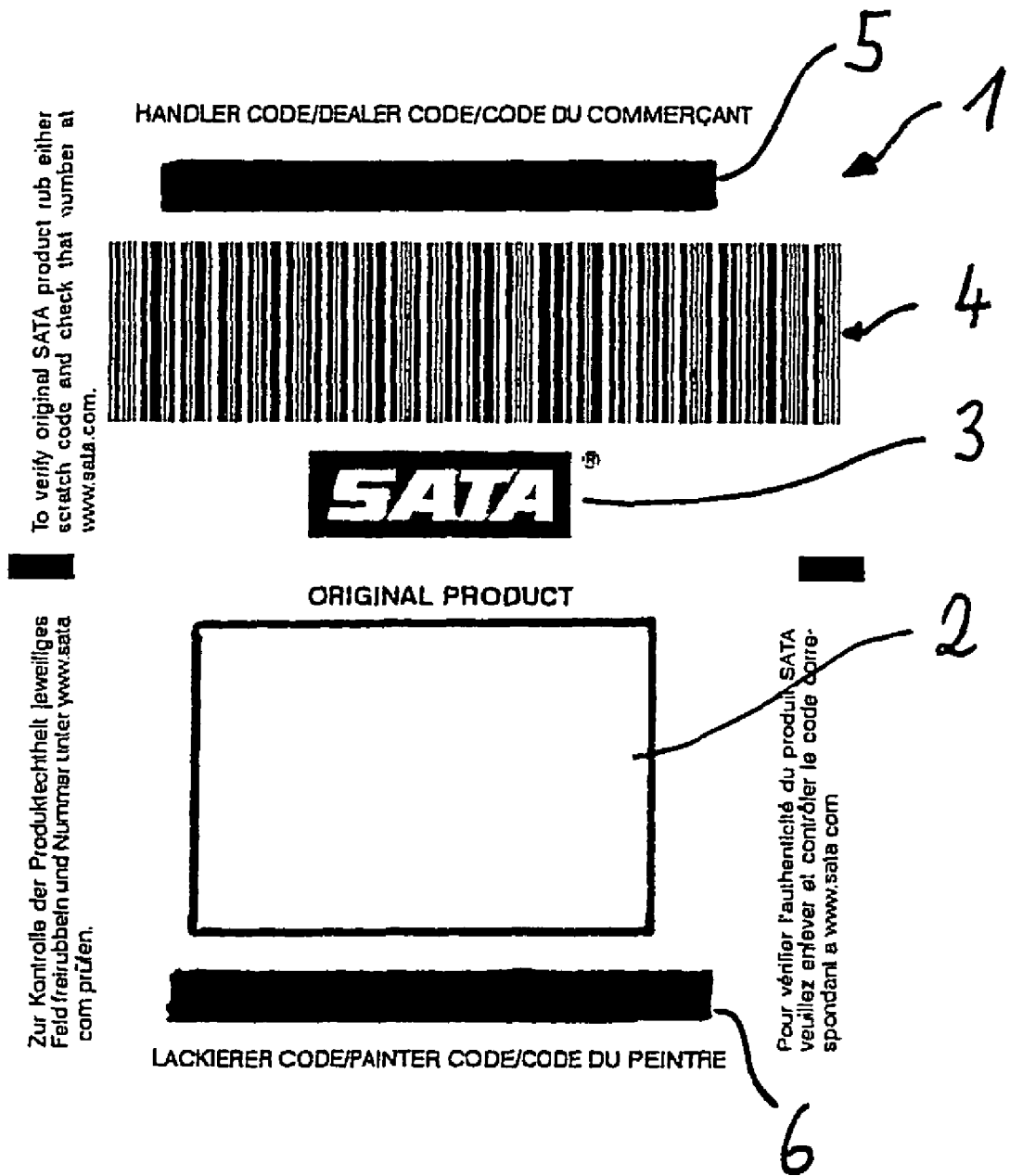

PRODUCT AUTHENTICATION METHOD

FIELD OF THE INVENTION

The invention pertains to a method that allows a third party to authenticate a manufacturer's individual product, as well as to a label to be used in a method of this type.

BACKGROUND OF THE INVENTION

The manufacturers of name-brand products and the parties participating in the distribution process, i.e., importers and exporters, wholesalers and retailers, as well as end users, need to identify and authenticate individual products of a name-brand product series. This enables the manufacturers to precisely track the distribution path and the respective times at which the individual product is sold over the various stages of distribution, e.g., in order to ensure that products intended for a certain country are only sold in this country. The merchants and end users (as well as the manufacturer) want to determine whether a certain product is an original product of the name-brand manufacturer or a counterfeit product, i.e., a fake.

This is the reason various methods were developed for authenticating products over the distribution path. In these methods, it is common practice to initially generate a code, e.g., as described in WO 03/007252A1. This code is a relatively counterfeit-proof random code that is assigned once to each individual product, i.e., this code makes it possible to identify an individual product of a product series. This code is applied onto the product itself or onto the product packaging, e.g., printed on a label that is subsequently applied onto the product packaging. The manufacturer simultaneously enters this code into a database that contains a list of all assigned and therefore valid codes. This database is publicly accessible, particularly via the Internet, such that the parties participating in the distribution process are able to access this data in the form of a query. The product is subsequently placed on the market. As soon as the product is acquired by a party participating in the distribution process, e.g., a merchant or an end user, this party is able to access the database via the Internet and to subsequently enter the printed code in order to receive a response indicating whether the code is contained in the database, i.e., if the code is identical to a stored code, and/or if this code was already the object of a prior query. This response enables the merchant or end user to determine the authenticity of the product. If the database response indicates that the number entered by the respective party is not contained in the database, it is quite obvious that the respective product is not an original, but rather a counterfeit. If the response indicates that the code exists in the database, but was already the object of a prior query by a third party (the database is able to store these queries), it is impossible to reliably determine whether the product is an original or a counterfeit because a merchant prior in the distribution chain could have queried the number or a counterfeiter could simply have copied the number. If the response indicates that the number exists in the database and was not yet the object of a query, it can be initially assumed that the product is an original; however, the querying party is unable to determine with absolute certainty if the product is an original or a counterfeit because the product including the number could have been copied and the number of the original was not yet the object of a query.

A person skilled in the art can ascertain, for example, from DE 199 41 362 A1, that it is possible to provide a data carrier with a cover for concealing the code applied thereon in order to disclose this code to the authorized user only (after removing the cover, e.g., a scratch-off layer). However, this particular publication merely describes a data carrier with a removable cover, e.g., for concealing PIN codes from unauthorized third parties.

DE 199 45 760 A1 pertains to a system for checking if an object originates from an assumed source, wherein the object is provided with at least one marking that can be recognized by a detector and the marking recognized by the detector can be compared with individual characteristics of the source. This system is also not counterfeit-proof and falls short of the method described above (with reference to WO 03/007252A1).

Consequently, existing methods provide a name-brand manufacturer with a certain overview of the distribution path as long as the participating parties regularly query the numbers or codes. However, these systems do not provide the parties participating in the distribution process with a sufficiently reliable option for determining whether a product is an original product or a counterfeit.

SUMMARY OF THE INVENTION

The invention is based on the objective of additionally developing an authentication method in such a way that originals can be distinguished from counterfeits with sufficient reliability, and of making available a corresponding label for use in a method of this type.

BRIEF DESCRIPTION OF THE DRAWING

One embodiment of the invention is described in greater detail below with reference to the drawing. It shows a label according to the invention.

DETAILED DESCRIPTION OF THE INVENTION

The method according to the invention is based on a method of the type described in the introductory portion of the description.

The name-brand manufacturer generates a specific code for the individual product of a product series, for example, on a computer with the aid of a suitable algorithm. This code consists, for example, of a sequence of numbers and/or letters or of other visible symbols suitable for data processing. The code is sufficiently long and complex for ensuring that the probability of a third party randomly using this code is sufficiently low. The name-brand manufacturer applies this code onto the product itself or preferably onto the product packaging. This is preferably realized by applying the code onto a label, if applicable, together with other information as shown in the FIGURE. This label is then applied to the product packaging, for example, the front side or upper side of the packaging. However, it is preferred to apply the label over an edge of the packaging such that the label is destroyed once the packaging is opened.

The entire label 1 is shown in the FIGURE. It comprises a hologram section 2 that serves as an additional safety measure, the name 3 of the name-brand manufacturer and a bar code 4 that also serves for product identification purposes and can be read by a scanner. In addition, the label 1 contains two (covered) codes 5 and 6, wherein the code 5 is a merchant code and the code 6 is an end-user code. Since the product is a spray gun in the embodiment shown, the end user is a painter and the code 6 is a painter's code.

In the following portion of the description, the merchant code 5 is referred to as the first code, and the painter's code 6 is referred to as the second code.

Analogous to the state of the art, the name-brand manufacturer maintains a publicly accessible database that can be accessed, for example, via the Internet for each individual name-brand product, wherein said database contains all assigned codes, namely the first as well as the second codes. The database is also able to set a flag once a code is the object of a query, wherein said flag indicates whether the code was already the object of a prior query. This information can also be output after re-querying the database. The database is conventionally protected from "hackers," e.g., by means of an access code.

According to the FIGURE, both codes 5 and 6 are not legible but are rather covered with a removable cover that conceals the codes 5 and 6. This cover consists, for example, of a conventional scratch-off layer, i.e., a plastic or rubber-like mass that completely conceals the codes 5 and 6, but can be scratched off with one hand or with an object in order to make the codes 5 and 6 legible. The scratch-off mass is removed during this process and cannot be easily restored.

The name-brand product is shipped from the manufacturing facility with codes 5 and 6 covered so that they are not legible.

Once the product is placed on the market and, for example, acquired by a merchant, this merchant is authorized to expose the first code (merchant code) 5 and can then conventionally enter the code 5 into the publicly accessible database. Subsequently, the merchant receives one of three possible responses from the database:

The code you entered was not assigned to an original product. If you entered the code correctly, it must be assumed that the product is a counterfeit.

This instance exactly corresponds to that described above with reference to the state of the art. The code is not contained in the list of original codes and was generated by a counterfeiter who was not familiar with the original code. In this case, the unmistakable result is that the product is a counterfeit.

The code you entered was assigned to an original product, but already used at least once for authentication purposes. If the code section of the label was already scratched off, it is possible that the product is an original. In this case, we ask you to check the second authentication code. If you have exposed the code yourself, it must be assumed that the product is a counterfeit.

In this case, it is highly probable that the product is a counterfeit. However, it is not impossible that the product is an original because the counterfeit number may initially have been the object of a query by a third party. But this is highly improbable because only one original number is respectively assigned and several identical counterfeit numbers are in existence.

The authentication code you entered was assigned to an original product. The product is in all probability an original product.

In this case, the code was exposed by scratching off the cover and not yet the object of a query, so that it must be assumed in all probability that the product is an original. The product can only be a counterfeit in the highly improbable circumstance that the product is the first counterfeit put on market and the original was not yet the object of a query.

The first code and the second code 6 also interact in such a way that, in the second above-described instance in which the original code was already the object of a query, the merchant has the option of accessing the second code that was actually intended for the painter and thereby determining the origin of the product with absolute certainty. If the merchant did not utilize the optional query, the end user can use both codes for verification purposes.

The authentication by the end user or painter with the aid of the second code 6 is carried out analogously.

In comparison with methods known from the state of the art, the method of the invention provides a nearly flawless option for authenticating an individual product of a product series.

The invention claimed is:

1. A method for authenticating an individual product of a manufacturer to a distribution level and to a third party, which comprises:
   generating a first code, said first code being specific to the individual product and serving to authenticate the individual product to the distribution level;
   generating a second code distinct from that of the first code, said second code being specific to the individual product and serving to authenticate the individual product to the third party;
   applying said first code to the individual product or packaging of the individual product;
   applying said second code to the individual product or packaging of the individual product;
   storing said first code in a publicly accessible database to create a stored first code;
   storing said second code in said publicly accessible database to create a stored second code;
   concealing said first code;
   concealing said second code;
   revealing said first code by the distribution level;
   reading said first code by the distribution level;
   submitting said first code to said publicly accessible database by the distribution level;
   determining if said first code is in said database;
   determining if said first code was previously submitted;
   revealing said second code by the third party;
   reading said second code by the third party;
   submitting said second code into the publicly accessible database by the third party;
   determining if said second code is in said database; and
   determining if said second code entered by the third party was previously submitted, wherein the second code can be used to authenticate the individual product if the first code is in the publicly accessible database and the first code was previously submitted for verification and the first code was not revealed by the distribution level.

2. The method according to claim 1, wherein at least one of said first code and said second code is covered by a revealable cover.

3. The method according to claim 2, wherein said revealable cover is a scratch-off cover.

4. The method according to claim 1, which further comprises confirming said second code has not been revealed by someone other than the third party.

5. The method according to claim 1, wherein the manufacturer applies the first code to the individual product or the packaging of the individual product.

6. The method according to claim 1, wherein the manufacturer applies the second code to the individual product or the packaging of the individual product.

7. The method according to claim 1, wherein the third party is an end-user of the individual product.

8. The method according to claim 1, wherein the first code is a merchant code and the second code is an end-user code.

9. The method according to claim 8, wherein the individual product is a spray gun for paint and the end-user code is a painter's code.

10. A method for authenticating an individual product of a manufacturer, which comprises:

generating a first code, said first code being unique to the individual product;

generating a second code distinct from that of the first code, said second code being unique to the individual product;

applying said first code to the individual product or packaging of the individual product;

applying said second code to the individual product or packaging of the individual product;

storing said first code in a publicly accessible database to create a stored first code;

storing said second code in said publicly accessible database to create a stored second code;

concealing said second code;

reading said first code;

submitting said first code to said publicly accessible database;

determining if said first code is in said database;

determining if said first code was previously submitted to said database;

revealing said second code if said first code was previously submitted to said database;

reading said second code;

submitting said second code to the publicly accessible database;

determining if said second code is in said database; and determining if said second code was previously submitted to said database, wherein if the first code is in the publicly accessible database and if the first code was previously submitted for verification and if the first code was previously revealed, then the second code can be utilized to determine whether the individual product is authentic.

11. The method according to claim 10, wherein the second code is covered by a revealable cover.

12. The method according to claim 11, wherein said revealable cover is a scratch-off cover.

13. The method according to claim 10, wherein the manufacturer applies the first code to the individual product or the packaging of the individual product.

14. The method according to claim 10, wherein the manufacturer applies the second code to the individual product or the packaging of the individual product.

15. The method according to claim 10, wherein the first code is a merchant code and the second code is an end-user code.

16. The method according to claim 15, wherein the individual product is a spray gun for paint and the end-user code is a painter's code.

* * * * *